(12) United States Patent
Corbeil et al.

(10) Patent No.: US 8,470,214 B2
(45) Date of Patent: Jun. 25, 2013

(54) METHOD FOR FABRICATION OF A DETECTOR COMPONENT USING LASER TECHNOLOGY

(75) Inventors: James L. Corbeil, Knoxville, TN (US); Troy Marlar, Knoxville, TN (US); Matthias J. Schmand, Lenoir City, TN (US); Niraj K. Doshi, Knoxville, TN (US); Mark S. Andreaco, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 742 days.

(21) Appl. No.: 10/856,225

(22) Filed: May 28, 2004

(65) Prior Publication Data

US 2004/0262526 A1  Dec. 30, 2004

Related U.S. Application Data

(60) Provisional application No. 60/474,430, filed on May 30, 2003.

(51) Int. Cl.
 *B29D 11/00* (2006.01)
(52) U.S. Cl.
 USPC ........ 264/1.37; 250/367; 250/486.1; 264/400
(58) Field of Classification Search
 USPC ................. 264/1.37, 400, 482; 250/367, 368, 250/486.1, 487.1
 See application file for complete search history.

(56) References Cited

U.S. PATENT DOCUMENTS

| 3,936,645 A | 2/1976 | Iversen |
| 4,749,863 A | 6/1988 | Casey |
| 4,914,301 A | 4/1990 | Akai |
| 4,982,096 A | 1/1991 | Fuji et al. |
| 5,047,642 A * | 9/1991 | Pleyber et al. ................ 250/368 |

(Continued)

FOREIGN PATENT DOCUMENTS

| JP | 09-061536 A | 9/1998 |
| JP | 2001-283731 A | 3/2003 |
| WO | 00/32349 | * 6/2000 |

OTHER PUBLICATIONS

Moriya et al., "Development of PET Detectors Using Monolithic Scintillation Crystals Processed with Sub-Surface Laser Engraving Technique," 2009 IEEE Nuclear Science Symposium Conference Record, pp. 3560-3564.

(Continued)

*Primary Examiner* — Mathieu D. Vargot
(74) *Attorney, Agent, or Firm* — Peter Kendall

(57) ABSTRACT

A method for fabricating a detector or light guide using laser technology. The method yields a detector component such as a scintillator, light guide or optical sensor which provides for the internal manipulation of light waves via the strategic formation of micro-voids to enhance control and collection of scintillation light, allowing for accurate decoding of the impinging radiation. The method uses laser technology to create micro-voids within a target media to optically segment the media. The micro-voids are positioned to define optical boundaries of the optically-segmented portions forming virtual resolution elements within the scintillator. Each micro-void is formed at its selected location using a laser source. The laser source generates and focuses a beam of light into the target media sequentially to form the micro-voids. The laser beam ablates the media at the focal point, thereby yielding the micro-void.

19 Claims, 6 Drawing Sheets

U.S. PATENT DOCUMENTS

| | | | |
|---|---|---|---|
| 5,059,800 A | 10/1991 | Cueman et al. | |
| 5,453,623 A | 9/1995 | Wong et al. | |
| 5,673,244 A | 9/1997 | Choi | |
| 5,786,560 A | 7/1998 | Tatah et al. | |
| 5,886,318 A | 3/1999 | Vasiliev et al. | |
| 6,151,769 A * | 11/2000 | Bliss et al. | 29/600 |
| 6,292,529 B1 | 9/2001 | Marcovici et al. | |
| 6,399,914 B1 | 6/2002 | Troitski | |
| 6,417,485 B1 | 7/2002 | Troitski | |
| 6,426,480 B1 | 7/2002 | Troitski | |
| 6,727,460 B2 | 4/2004 | Troitski | |
| 6,796,148 B1 * | 9/2004 | Borrelli et al. | 65/386 |
| 2005/0023733 A1 * | 2/2005 | Burr | 264/400 |

OTHER PUBLICATIONS

Japanese Office Action (with English translation) dated Mar. 30, 2010.

* cited by examiner

METHOD FOR FABRICATION OF A DETECTOR COMPONENT USING LASER TECHNOLOGY

CROSS-REFERENCE TO RELATED APPLICATIONS

This application claims the benefit of U.S. Provisional Application No. 60/474,430, filed May 30, 2003.

STATEMENT REGARDING FEDERALLY SPONSORED RESEARCH OR DEVELOPMENT

Not Applicable

BACKGROUND OF THE INVENTION

1. Field of Invention

The present invention pertains to the field of detectors for use in imaging applications including X-ray imaging, fluoroscopy, positron emission tomography (PET), single photon emission computed tomography (SPECT), computed tomography (CT), gamma camera and digital mammography systems. More specifically, the present invention is directed toward the manufacture of a radiation detector using a method for internal manipulation of light waves via the strategic formation of micro-voids, in either the detection media or the light-transmitting media, in a way as to enhance the control and collection of the resultant scintillation light, allowing for the accurate decoding of the impinging radiation.

2. Description of the Related Art

Imaging is widely used in many applications, both medical and non-medical. In the field of imaging, it is well known that imaging devices incorporate a plurality of scintillator arrays for detecting radioactivity from various sources. It is also common practice, when constructing scintillator arrays composed of discrete scintillator elements, to pack the scintillator elements together with a reflective medium interposed between the individual elements creating photon boundaries. Conventionally the reflective medium serves to direct the scintillation light along the scintillator element into a light guide to accurately assess the location at which the radiation impinges upon the detector elements. The reflective medium further serves to increase the light collection efficiency from each scintillator element as well as to minimize the cross-talk, or light transfer (transmission of light), from one scintillator element to an adjacent element. Reflective mediums include reflective powders, films, paints, and adhesives doped with reflective powders, or a combination of materials. Reflective paints and powders contain one or more pigments such as MgO, $BaSO_4$, and $TiO_2$. Regardless of the approach, fabrication of radiation detector arrays is a time- and labor-intensive process, with product uniformity dependent upon the skill level of the workforce. With the current market trend of higher spatially-resolute systems containing an order of magnitude more pixels than current designs, these process effects are even more pronounced.

Detector arrays are commonly integrated with photomultiplier tubes (PMTs) or solid-state detectors such as avalanche photodiodes (APDs), PIN diodes, and charge-coupled devices (CCDs). The incident high-energy photons absorbed by the scintillating material are converted to lower energy scintillation photons, which may be guided to the detectors via one or more of the following: the scintillator itself, a light guide, and other established means of light distribution.

In the arrangement wherein a light guide and/or other established means is used, commonly the light guide is formed by creating slits of various depths in a suitable substrate. Once packed with a reflective media, the light guide becomes an effective method to channel light and to enhance the position information of the scintillator. In the arrangement wherein paint or reflective tape is used, the paint or reflective tape is applied directly to the scintillators, achieving similar results. The height and placement of the applied reflective material varies according to design.

Conventionally, scintillator arrays have been formed from polished or unpolished crystals that are either: hand-wrapped in reflective PTFE tape and bundled together; glued together using a white pigment such as $BaSO_4$ or $TiO_2$ mixed with an epoxy or RTV; or glued to a glass light guide with defined spacing and afterwards filled with reflective material as discussed above.

Another approach utilizes individual reflectors bonded to the sides of certain scintillator elements with the aid of a bonding agent. An array is formed by arranging the individual elements spatially such that the impingement of the high-energy photon is decoded accurately.

Other devices have been produced to form an array of scintillator elements. Typical of the art are those devices disclosed in the following U.S. patents:

| U.S. Pat. No. | Inventor(s) | Issue Date |
| --- | --- | --- |
| 3,936,645 | A. H. Iverson | Feb. 3, 1976 |
| 4,749,863 | M. E. Casey | Jun. 7, 1988 |
| 4,914,301 | Y. Akai | Apr. 3, 1990 |
| 4,982,096 | H. Fujii et al. | Jan. 1, 1991 |
| 5,059,800 | M. K. Cueman et al. | Oct. 22, 1991 |
| 5,453,623 | W. H. Wong et al. | Sep. 26, 1995 |
| 6,292,529 | S. Marcovici et al. | Sep. 18, 2001 |

Of these patents, the '645 patent issued to Iverson discloses a radiation sensitive structure having an array of cells. The cells are formed by cutting narrow slits in a sheet of luminescent material. The slits are filled with a material opaque to either light or radiation or both. The '800 patent issued to Cueman et al., discloses a similar scintillator array wherein wider slots are formed on the bottom of the array.

Most of the aforementioned methods require a separate light guide attached to the bottom of the detector array to channel and direct the light in a definitive pattern on to a transducer or set of transducers such as photomultiplier tubes or diodes. This light guide usually contains slits in varying depths to alter the light pattern onto the transducer(s). In addition the slits are filled with reflective material as discussed in the '863 patent issued to Casey.

The '623 patent issued to Wong et al., teaches a PET camera having an array of scintillation crystals placed adjacent other arrays surrounding a patient area. The edges between the arrays of crystals are offset in relation to the edges between the light detectors, allowing use of circular photomultiplier tubes instead of the more expensive square photomultiplier tubes. This arrangement is referred to as quadrant-sharing, in which each light detector is suitably positioned adjacent four adjacent quadrants of four respective arrays to detect radiation emitted from the four quadrants of each array. The crystals within the arrays are described as being selectively polished and bonded to adjacent crystals to present a cross-coupled interface in order to tunably distribute light to adjacent light detectors. The crystal arrays are formed by optically bonding slabs of crystals into a "pre-array" and then cross-cutting the "pre-array" from one or more sides to form the final array. The grooves may be optically treated, such as with white reflective fillers, for further optical control within the array. In addition, optical jumpers may be coupled to the free end of the array to correct for decoding distortion.

The preparation of light guides and scintillator crystal arrays represent a substantial expenditure in the overall production cost of radiation detectors. Current production means also limit light-channeling geometry to simple rectilinear shapes, due to the increase in complexity of non-rectilinear shapes. An increase in complexity translates into an increase in cost. Additionally, with the current market trend heading towards higher resolution systems containing an order of magnitude more pixels than current designs, cost and labor expenses have become more significant.

An emerging technology that has been used to create ornamental pieces uses laser technology to create three-dimensional images in a transparent material such as glass. Typical of the art are those devices disclosed in the following U.S. patents:

| U.S. Pat. No. | Inventor(s) | Issue Date |
| --- | --- | --- |
| 5,637,244 | A. I. Erokhin | Jun. 10, 1997 |
| 5,786,560 | A. Tatah et al. | Jul. 28, 1998 |
| 5,886,318 | A. V. Vasiliev et al. | Mar. 23, 1999 |
| 6,399,914 | I. Troitski | Jun. 4, 2002 |
| 6,417,485 | I. Troitski | Jul. 9, 2002 |
| 6,426,480 | I. Troitski | Jul. 30, 2002 |
| 6,727,460 | I. Troitski | Apr. 27, 2004 |

Erokhin, in the '244 patent, discloses a method of creating an image inside a transparent material with the aid of a pulsed laser beam. The Erokhin method involves the use of a diffraction-limited Q-switched laser, in particular, a solid-state single-mode $TEM_{00}$ laser; sharp focusing of the laser beam to provide an adjustable micro-destruction in the material being treated; and mutual displacement of the laser beam and the material being treated after each laser shot to a next point of the image being reproduced. The micro-destruction induced in the material at a pre-set point is adjustable in size by varying the actual aperture of the focusing lens and laser radiation power simultaneously.

The '560 patent teaches a method of treating a material using an ultraviolet (UV) wavelength laser beam having femtosecond pulses. The UV laser beam is split into a plurality of separate laser beams having femtosecond pulses. The separate laser beams are directed onto a target point within a sample such that the femtosecond pulses of the separate beams overlap to create an intensity sufficient to treat the sample.

Vasiliev et al., in their '318 patent, disclose a method for laser-assisted image formation in transparent specimens. The '318 method includes the steps of establishing a laser beam having different angular divergence values in two mutually square planes, and focusing the laser beam at a present point of the specimen. In the course of image formation the specimen is displaced with respect to the point of radiation focusing in order to change an angle between the plane with a maximum laser beam angular divergence and the surface of the image portion being formed so as to suit the required contrast of the image portion involved.

In the patents issued to Troitski, Troitski discloses a system for high-speed production of high quality laser-induced damage images inside transparent materials. The images are produced by the combination of an electro-optical deflector and means for moving the article or focusing the optical system. The Troitski device creates laser-induced damage by generation of breakdowns at several separate centers by using the computing phase hologram, the phase structure of which is calculated so that the laser beam, passing through the hologram, is focused at several spots. The Troitski patent further discloses a system for creation of a laser-induced damage by generation of breakdowns at an area where two laser beams intersect. This decreases the image deterioration conditioned by the use of a deflector and allows to create etch points with different brightness for different directions. In the '914 Troitski patent, one laser is disclosed as generating radiation to heat the material area about a point to the vitrify temperature in order to produce material breakdown.

BRIEF SUMMARY OF THE INVENTION

The present invention is a method for the fabrication of an optically-segmented detector and/or light guide. The method of the present invention uses laser technology to create a series of micro-voids within a target media to segment the media in order to form a position-decoding detector or light guide with characteristics similar to conventional counterparts fabricated using the methods of the prior art.

One detector component of the present invention is a scintillator in which a plurality of micro-voids is defined to collectively function to channel scintillation light through optically-segmented portions of the scintillator. The micro-voids are positioned to define the optical boundaries of the optically-segmented portions of the scintillator. The micro-voids may be disposed in varying sizes in a specific uniform pattern, or randomly placed. The micro-voids may be disposed in single or multiple layers, or may be randomly scattered within a given volume. The micro-voids may be disposed in planar, curvilinear, or other geometrically-arranged configurations. To this extent, the optically-segmented portions of the scintillator may define various cross-sectional configurations other than square. For example, the optically-segmented portions may define triangular, trapezoidal, or hexagonal geometries. Alternatively, the optically-segmented portions may define a combination of configurations, such as octagons and squares.

In the method of the present invention, where the distribution pattern of the micro-voids is pre-determined, the position of each micro-void within the scintillator is determined as required. Where the distribution of the micro-voids is random, parameters limiting the position of each micro-void are determined. Each micro-void is formed using a laser source. The laser source is used to generate and focus a beam of light into a target media at each selected location in sequence. The laser source yields a laser beam of sufficient power to ablate the target media at the focal point, thereby yielding the micro-void.

The target media used in the present invention is either a scintillator or a light-transmitting block, or light guide. The target media is fabricated from a material that does not absorb in the wavelength of the laser. The intense energy collecting at the focal point of the laser beam creates a micro-void within the target media that extends outward in all directions from the point of origin. The laser source is controlled and systematically pulsed while the laser beam is concurrently and incrementally repositioned and refocused to create the pre-determined disposition of each micro-void within the target media, whether patterned or disposed at random.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

A method for the fabrication of detector components is described herein. The method of the present invention uses laser technology to create a series of optical scatter centers, or micro-voids, within a scintillation material in order to form optically-segmented virtual resolution elements with characteristics similar to detector arrays fabricated using the methods of the prior art. An optically-segmented light guide may be fabricated using the method of the present invention as well.

Figure 1:
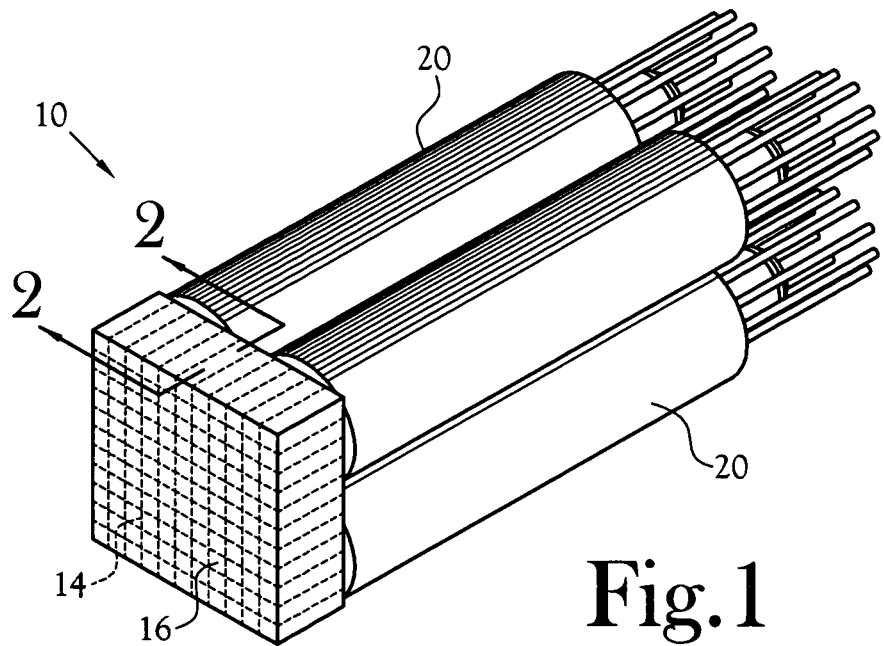
FIG. 1 a perspective view of a detector fabricated using the method of the present invention.

Illustrated in FIG. 1 is a perspective view of a detector component 10 fabricated using the method of the present invention, shown in relation to an array of photomultiplier tubes (PMTs) 20. The detector component 10 of the present invention is fabricated from a target media in which a plurality of micro-voids 12 (see FIG. 2) is defined to collectively function to manipulate light waves to enhance the control and collection of the resultant scintillation light, allowing for the accurate decoding of the impinging radiation. The micro-voids 12 are positioned to define the optical boundaries 14 of the optically-segmented portions 16 of the detector component 10. The configurations for the relative disposition of the micro-voids 12 are endless. For example, the micro-voids 12 may be disposed in varying sizes in a specific uniform pattern, or may be randomly placed, or may form over-sampled optically-segmented virtual resolution elements. The micro-voids 12 may be disposed in single or multiple layers, or may be randomly scattered within a given volume. The micro-voids 12 may be disposed in planar, curvilinear, or other geometrically-arranged configurations. To this extent, the optically-segmented portions 16 of the detector component 10 may define various cross-sectional configurations other than square. For example, the optically-segmented portions 16 may define, but are not limited to, triangular, trapezoidal, or hexagonal configurations. Alternatively, the optically-segmented portions 16 may define a combination of configurations, such as octagons and squares. Further, the optically-segmented portions 16 may define varying cross-sections as they progress from one end of an optically-segmented portion 16 to the other, including transitioning from one geometric shape to another, and/or transitioning from one size to another. The various configurations are dependent upon various factors, but are selected to function with similar or improved results as compared to reflective surfaces provided in prior art devices. While specific configurations have been mentioned, the present disclosure is not intended to be limited by such configurations. Such configurations are described merely to accentuate the limitless number of configurations which may be incorporated to achieve the present invention.

Figure 2:
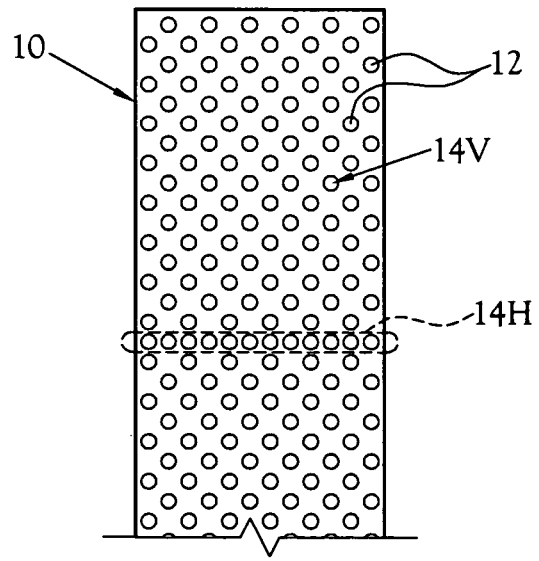
FIG. 2 illustrates a portion of the detector of FIG. 1, shown in section taken at 2-2 of FIG. 1.

FIG. 2 illustrates, in section, a portion of the detector component 10 shown in FIG. 1. Illustrated is an array of non-contiguous, independent micro-voids 12 formed using the method of the present invention. The micro-voids 12 in this embodiment are disposed in a single layer and are arranged in a honeycomb pattern. In the view illustrated in FIG. 2, a vertical layer 14V—representative of a vertical optical boundary—of micro-voids 12 is illustrated. Also illustrated is a single row 14H of micro-voids 12 representative of a horizontal layer. Again, while illustrated as single, planar layers having geometrically arranged micro-voids 12, the micro-voids 12 may alternatively be arranged in any other pattern, or configuration, or may be disposed randomly.

Figure 3:
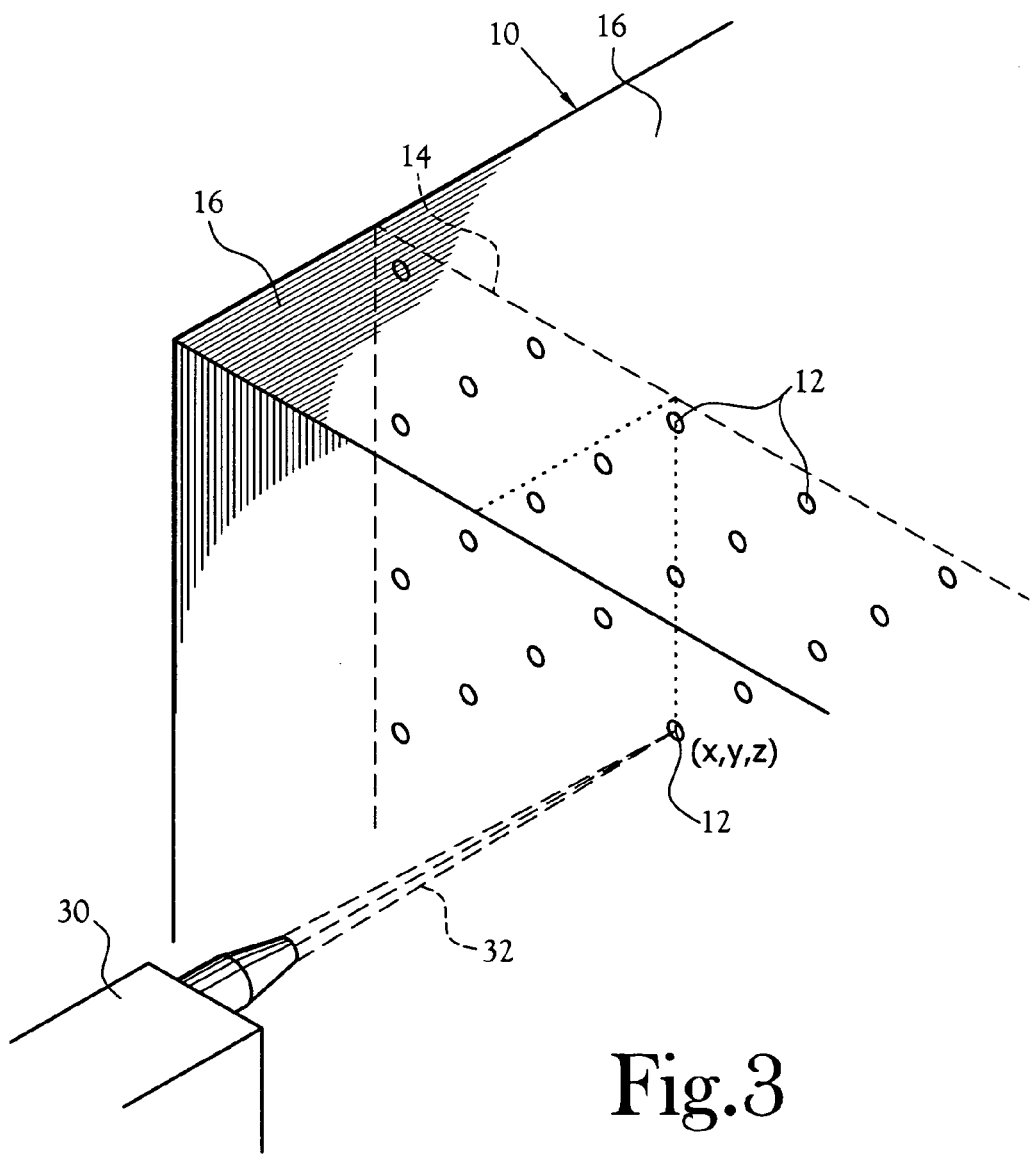
FIG. 3 illustrates the method of the present invention wherein a laser source is used to focus a laser beam in the target media to ablate the target media at a selected location to form a void.

FIG. 3 illustrates more clearly the method of the present invention, wherein the plurality of the micro-voids 12 is formed. The position of each micro-void 12 within the detector component 10 is determined as required. In the illustrated embodiment, a selected micro-void 12 is being formed at location (x, y, z) using a local coordinate system. As shown, the micro-voids 12 are formed in a spatial surface 14 defined in the medium 10 to form an optical boundary. In FIG. 3, surface 14 is a plane; however, non-rectilinear surfaces are also possible. A laser source 30 is used to generate and focus a beam 32 of light into a target media 10 at the location (x, y, z). The laser source 30 yields a laser beam 32 of sufficient power to alter the optical properties of the detector component 10 at the focal point, thereby yielding the micro-void 12.

The target media 10 used in the present invention is either of a scintillator, a light-transmitting object (or light guide), or both. To this extent, the light-transmitting object includes any configuration including but not limited to a block, optical fiber(s), optical tube(s), and the entrance window of an optical sensor. The target media 10 is fabricated from a material that does not absorb in the wavelength of the laser beam 32. The intense energy collecting at the focal point of the laser beam 32 creates a micro-void 12 within the target media 10 that extends outward in all directions from the point of origin. Typically, the micro-voids 12 are on the order of tens of microns in cross-section. However, it will be understood that the size of the micro-void 12 may be larger or smaller according to design. The laser source 30 is controlled and systematically pulsed while the laser beam 32 is concurrently and incrementally repositioned and refocused to create the predetermined disposition of each micro-void 12 within the target media 10, whether patterned or disposed at random.

The method of the present invention removes the geometric limitations as described in the background of the related art. The method of the present invention is capable of fabricating detector components 10 such as scintillators and light transmitting objects having rectilinear geometry. In addition, the method of the present invention is useful in fabricating detector components 10 defining more complex, multifaceted geometry, such as hexagonal and octagonal. Additionally, wavelike or curvilinear structures are also readily made available. Internalized geometry, generated by the focused laser beam 32, eliminate the extensive labor costs associated with the current detector production and require no additional effort when substituting non-rectilinear forms into the process or when increasing the number of internalized features. Moreover, this technology allows for other light distributing geometry to be incorporated within the media, including optically collimating, focusing, splitting, or scattering geometries.

Figure 4:
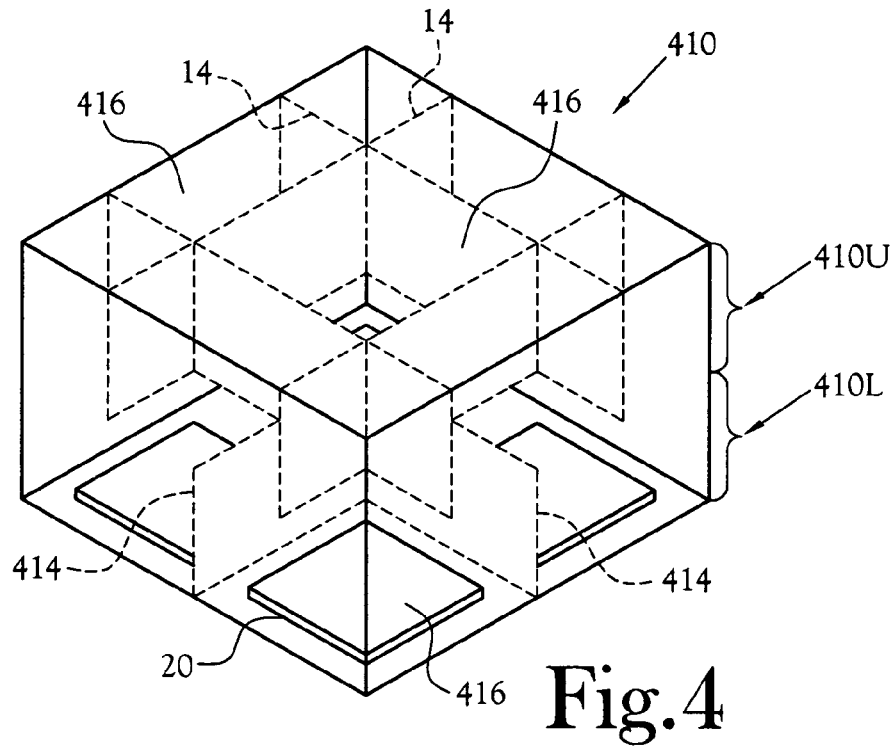
FIG. 4 illustrates a detector fabricated using the method of the present invention, the detector being used for detecting depth of interaction.

FIG. 4 illustrates a detector 410 fabricated using the method of the present invention. The detector 410 of the illustrated embodiment is a depth of interaction design (DOI). In this embodiment, the upper portion 410U of the detector 410 is optically-segmented into a 3×3 grid array and the lower portion 410L of the detector 410 is optically-segmented into a 2×2 grid array. The optical boundaries 414 of the grid arrays are formed using the method of the present invention. The DOI detector defines optically-segmented portions 416 configured in such a manner as to allow for the discernment of depth at which the scintillation material emits light when struck by radiation. As in conventional DOI detectors, an array of optical sensors 20 such as avalanche photodiodes (APDs) collects the lower energy scintillation light.

Figure 5:
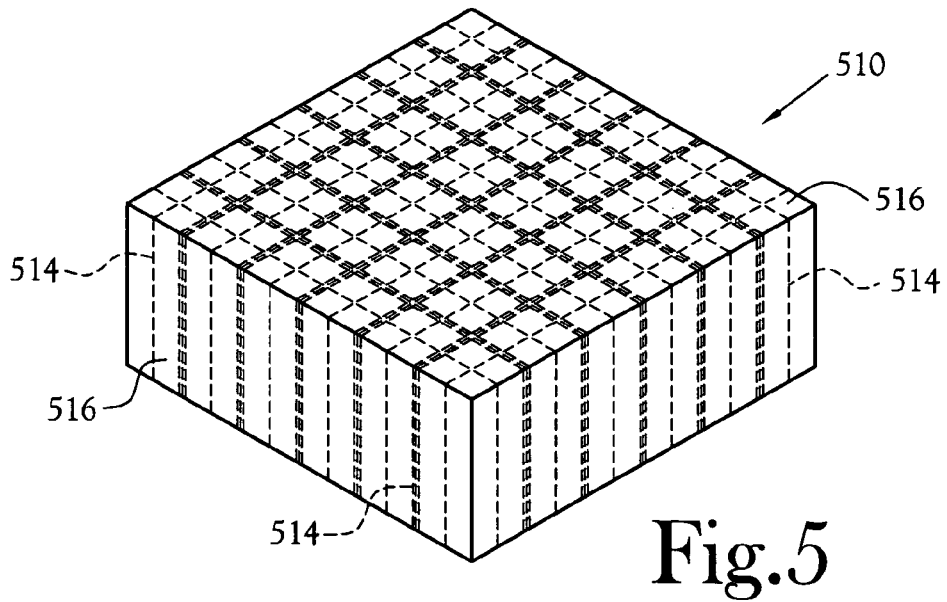
FIG. 5 illustrates a detector fabricated using the method of the present invention, the detector being used for over sampling.

FIG. 5 illustrates a further embodiment of a detector 510 fabricated using the method of the present invention. The illustrated embodiment of FIG. 5 is a monolithic detector design utilizing over sampling to achieve higher resolution. In this design, the feature density does not equate to intrinsic spatial resolution, but to virtual resolution elements that may be over-sampled. In this embodiment, the spacing between the optical boundaries 514 is varied such that blocks of four segments 516 are separated from each other and are bounded by a layer 514 of micro-voids 12 defining a substantially planar configuration. As described above, this layer 514 may be substantially two-dimensional or may define a thickness such that it defines a more pronounced thickness, or third dimension. The individual blocks of four segments 516 are themselves separated from each other. This separation can be accomplished with at least one layer 514 of micro-voids 12. Illustrated are three such layers 514 in order to accomplish a larger separation between the blocks of four segments 516. As in the DOI detector 410 described above, and as with other detector components 10 fabricated using the method of the present invention, conventional hardware such as PMTs and APDs is used in association with the over-sampling detector, as illustrated.

Figure 6:
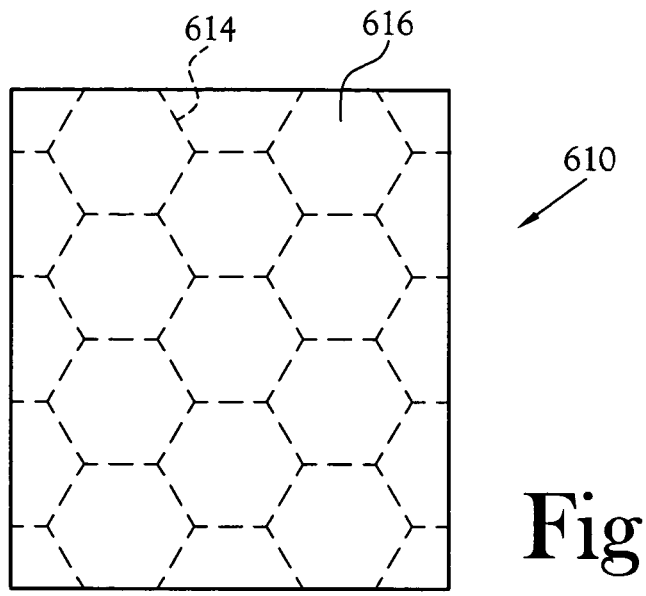
FIG. 6 illustrates a detector fabricated using the method of the present invention, the detector defining hexagonal segments.
Figure 7:
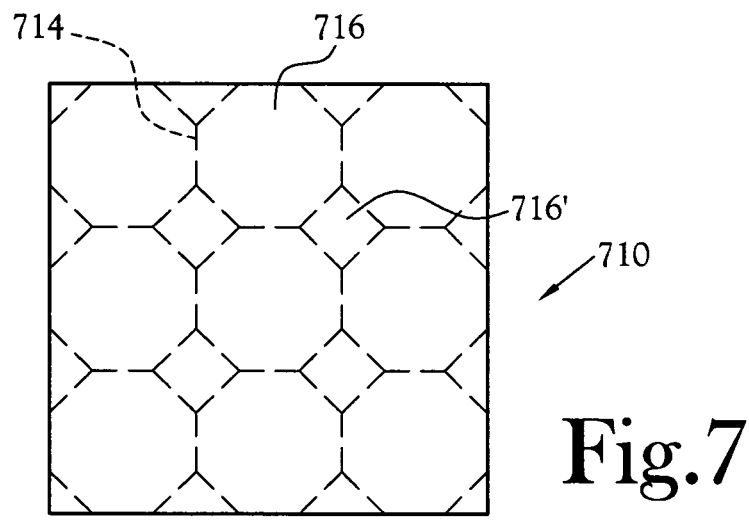
FIG. 7 illustrates a detector fabricated using the method of the present invention, the detector defining octagonal and square segments.

FIGS. 6 and 7 illustrate two detector components 610, 710 having non-rectilinear configurations. FIG. 6 illustrates an array of cells 616 defined by hexagonally-disposed optical boundaries 614. FIG. 7 illustrates and array of octagonal optically-segmented portions 716 alternating with square cells 716'. While several arrangements have been illustrated, it will be understood that the present invention is not limited to these few configurations. To this extent, it will be understood that the illustrated embodiments are disclosed as exemplifying the myriad of configurations contemplated by the present invention.

Figure 8:
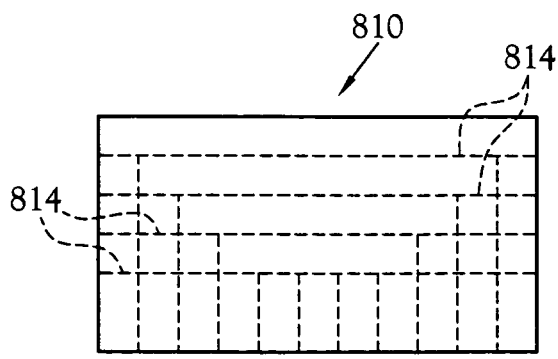
FIG. 8 illustrates a side elevation of a detector fabricated using the method of the present invention, the detector defining optical boundaries of varying heights.

FIG. 8 illustrates a side elevation of a detector component 810 fabricated using the method of the present invention. The illustrated component 810 defines optical boundaries 814 of varying heights, similar to conventional detectors of the prior art.

Figure 9:
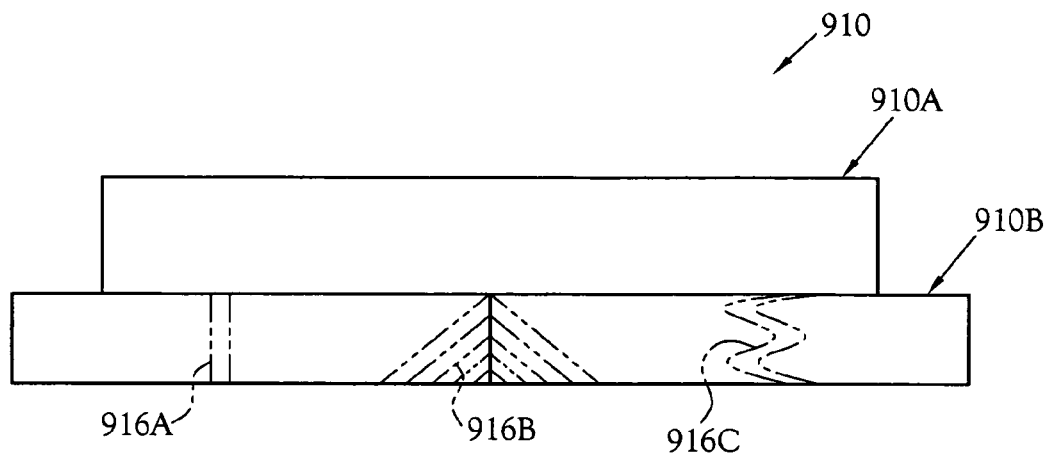
FIG. 9 is a side elevation of a light guide shown relative to a scintillator, the light guide showing several variations of configurations of optical boundaries defined therein.

In the embodiment illustrated in FIG. 9, a detector 910 includes a scintillator 910A and a light guide 910B. The light guide 10B is shown with various exemplary optical boundary 916 configurations. Specifically, illustrated three optical boundaries 916. These boundaries 916 include orthogonally disposed planar optical boundaries 916A, optical boundaries disposed to form a pyramidal disposition 916B for focusing or defocusing, and optical boundaries 916C defining compound curves. While three specific embodiments have been illustrated, it will be understood that the present invention is not intended to be limited to such disclosures.

Figure 10:
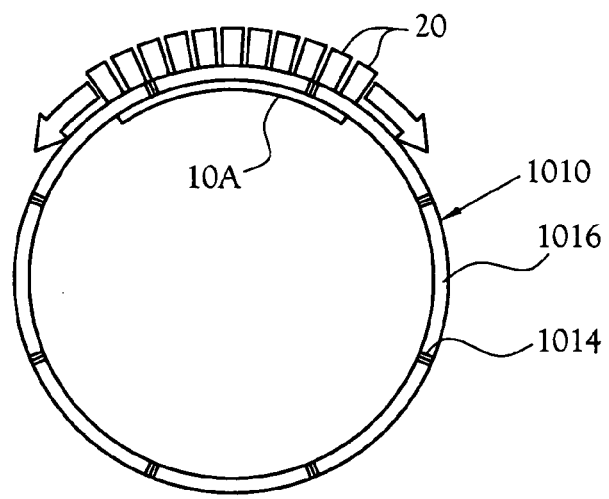
FIG. 10 is an end view of a circular light guide, where the method of the present invention is used to define optical boundaries at selected locations within the light guide.

Illustrated in FIG. 10 is an end view of a circular light guide 1010. Disposed within the circular light guide 1010 are scintillators 10A. Optical sensors 20 are disposed about the circular light guide 1010. The circular light guide 1010 is optically-segmented at specified intervals by optical boundaries 1014 to define optically-segmented portions 1016. In so doing, scintillation light is prevented from scattering throughout the entire circumference of the light guide 1010, which in turn prevents or at least reduces pile-up errors and minimizes the dead-time of the detector system.

Figures 11, 12:
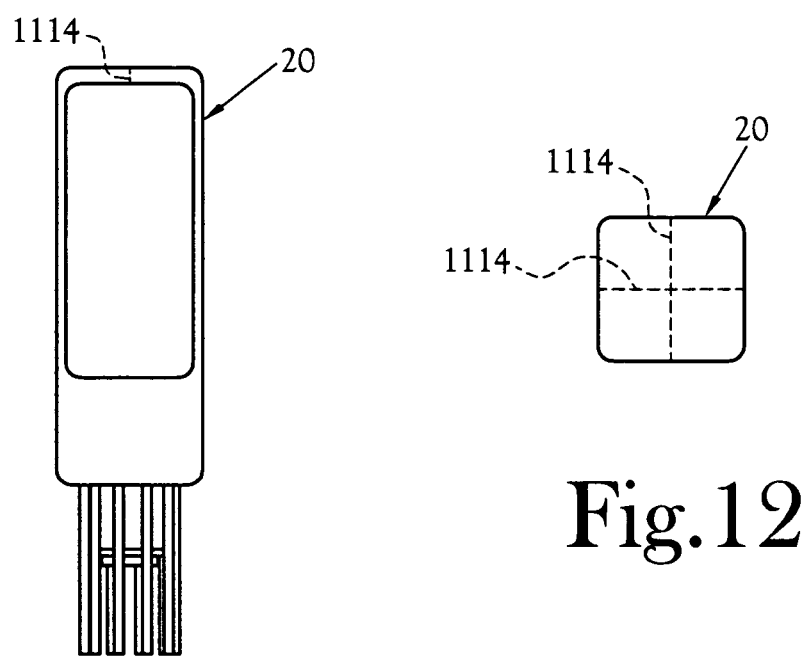
FIG. 11 is an elevation view of an optical sensor defining optical boundaries formed using the method of the present invention.
FIG. 12 is a top end view of the optical sensor of FIG. 11, wherein the optical sensor is optically-segmented using the method of the present invention.

Finally, illustrated in FIGS. 11 and 12 is an optical sensor 20 defining optical boundaries 1114 formed using the method of the present invention. As illustrated most clearly in FIG. 12, the entrance window of the optical sensor 20 in the illustrated embodiment is optically segmented into four quadrants, which reduces cross-talk between the channels in a multi-anode PMT.

From the foregoing disclosure, it will be seen by those skilled in the art that a method for fabricating a detector or light guide using laser technology has been disclosed. The method of the present invention yields a detector component such as a scintillator, light guide or optical sensor which provides for the internal manipulation of light waves via the strategic formation of micro-voids in a way as to enhance the control and collection of the resultant scintillation light, allowing for the accurate decoding of the impinging radiation. Moreover, detectors and light guides fabricated using the method of the present invention have been disclosed. The present invention provides a method for fabricating an optically-segmented detector and/or light guide using laser technology. A laser source is used to ablate a target media in a plurality of pre-selected locations. As such, optical boundaries are formed within the target media to define a plurality of segments or cells. The cells define any selected configuration(s) as required for a particular application. The resulting detectors and light guides require less time and expense to manufacture over conventional detectors and light guides. Further, detectors and light guides fabricated using the method of the present invention are not subject to the physical constraints associated with the fabrication of conventional detectors and light guides.

As a result of the method of manufacturing a detector component of the present invention, several advancements in the art are accomplished. First, it will be seen that a higher packing fraction in a detector block is achieved over conventional manufacturing methods. This results from the smaller relative size of the micro-voids as compared to the kerf resulting from cutting a scintillator in the prior art methods. The method of the present invention accomplishes a near 100% packing fraction, thus maximizing the sensitivity of the detector.

As a result of the elimination of the cutting processes of the prior art methods, several further advancements are accomplished. First, less material is wasted. Due to the nature especially of scintillator materials, recycling of any waste is required. Because there are no cuts being made into the scintillator, the need for recycling is all but eliminated. The cost of manufacture is also reduced with the corresponding reduction in material loss. Also as a result of the elimination of the cutting step, health risks associated with the manufacture of detector components are reduced. In conventional methods, small particles of the cut materials must be handled either during the manufacture process, the clean-up, or the recycling of the waste material. This requires the handling of toxic materials, aerosols, and other harmful materials. With the method of the present invention, this material handling is minimized, thus substantially reducing the risks associated with the manufacture of the detector components. Further, contamination of the detector during the manufacturing process has been eliminated. This is due in part to the fact that there are no kerfs into which contamination may be introduced, further in part to the elimination of the need for a packing material used in the prior art methods.

Also, as discussed above, the method of the present invention is not limited by geometric constraints presented in the methods of the present invention. As such, flat planar reflective surfaces are not required. Further, optically-segmented portions of the detector are not limited to rectangular configurations. Nor are the optically-segmented portions limited to constant cross-sectional shapes and sizes from one surface of the detector to the opposite surface. The method of the present invention allows for the formation of optically-segmented portions of varying shapes and sizes, including optically-segmented portions transitioning from one shape and/or size to another. Because the optically-segmented portions are being defined within a detector without being individually cut, it will be seen that the need for handling small pixel elements is eliminated. Thus, the manufacture of high resolution detectors has been made feasible with high output while also reducing the manufacturing costs.

Because the method of the present invention is equally applicable to the fabrication of scintillators, light guides, optical sensors and the like, it will be understood that corresponding components are easily manufactured to co-register one with the other. As a result, higher efficiency in the control and collection of scintillation light is achieved.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

The invention claimed is:

1. A method of forming an optical boundary within an optical medium of an imaging device, comprising:
   forming a plurality of non-contiguous, independent light-redirecting regions in a spatial surface within said medium defining a selected optical boundary within said medium.

2. The method of claim 1, wherein each of said plurality of non-contiguous, independent light-redirecting regions are formed by focusing a laser beam at a selected wavelength at a focal point at a different selected location on said spatial surface within said optical medium, thereby changing the optical properties of said optical medium at said focal point.

3. The method of claim 1, wherein said optical medium is a scintillator and wherein said optical boundary defines a boundary between separate optically-segmented resolution elements of said scintillator.

4. The method of claim 1, wherein said optical medium is a light-transmitting object and wherein said optical boundary defines a portion of a light guide within said light-transmitting object.

5. The method of claim 3, further including a plurality of optical boundaries cooperating to define a plurality of optically-segmented resolution elements.

6. The method of claim 3, wherein said plurality of optically-segmented resolution elements are rectilinear.

7. The method of claim 1, wherein said spatial surface is curvilinear.

8. The method of claim 1, wherein a size of each of said plurality of light-redirecting regions is independently selectable.

9. A nuclear imaging detector, comprising:
   a scintillator having a plurality of non-contiguous, independent light-redirecting regions in a spatial surface defining a selected optical boundary therewithin.

10. The nuclear imaging detector of claim 9, wherein said spatial surface is rectilinear.

11. The nuclear imaging detector of claim 9, wherein said spatial surface is non-rectilinear.

12. A light-guide, comprising:
    a light-transmitting material having a plurality of non-contiguous, independent light-redirecting regions in a spatial surface defining a selected optical boundary therewithin.

13. The light-guide of claim 12, wherein said spatial surface is rectilinear.

14. The light-guide of claim 12, wherein said spatial surface is non-rectilinear.

15. An optical medium of an imaging device, comprising:
    a plurality of non-contiguous, independent light-redirecting regions in a spatial surface within said medium defining a selected optical boundary within said medium.

16. The optical medium of claim 15, wherein said optical medium comprises a scintillator of a nuclear imaging detector.

17. The optical medium of claim 15, wherein said optical medium comprises a light guide.

18. The optical medium of claim 15, wherein said spatial surface is non-rectilinear.

19. The optical medium of claim 15, wherein said spatial surface is rectilinear.

* * * * *